United States Patent [19]
Caveney

[11] Patent Number: 5,953,401
[45] Date of Patent: Sep. 14, 1999

[54] TRANSPARENT CALLER INTERACTIVE ATTENDANT BYPASS SYSTEM

[75] Inventor: Jack E. Caveney, Hinsdale, Ill.

[73] Assignee: Panduit Corp., Tinley Park, Ill.

[21] Appl. No.: 08/130,669

[22] Filed: Oct. 1, 1993

Related U.S. Application Data

[63] Continuation of application No. 07/573,423, Aug. 27, 1990, abandoned, which is a continuation-in-part of application No. 07/219,505, Jul. 15, 1988, abandoned.

[51] Int. Cl.[6] .................................................. H04M 3/50
[52] U.S. Cl. ........................... 379/210; 379/373; 379/212
[58] Field of Search ..................................... 379/210, 211, 379/212, 213, 214, 373

[56] References Cited

U.S. PATENT DOCUMENTS

| | | | |
|---|---|---|---|
| 4,266,098 | 5/1981 | Novak | 379/199 |
| 4,629,831 | 12/1986 | Curtin et al. | 379/213 |
| 4,653,089 | 3/1987 | Eydelman | 379/179 |
| 4,682,354 | 7/1987 | Vanacore | 379/211 |
| 4,696,028 | 9/1987 | Morganstein et al. | 379/213 |
| 4,794,637 | 12/1988 | Hashimoto | 379/67 |
| 4,953,201 | 8/1990 | Hashimoto | 379/189 |

FOREIGN PATENT DOCUMENTS

| | | |
|---|---|---|
| 122354 | 9/1983 | European Pat. Off. . |
| 60-084091 | 5/1985 | Japan . |
| 8503533 | 12/1985 | Netherlands . |

*Primary Examiner*—Ahmad F. Matar
*Attorney, Agent, or Firm*—Mark D. Hilliard; Robert A. McCann; Michael J. Turgeon

[57] ABSTRACT

Disclosed is a call processor for use with a telephone switching system which allows an incoming caller to complete the call to an internal destination without operator assistance and without receiving a generated voice message. If the caller does not complete the call within a predetermined time, the call is transferred to either a switchboard attendant or a predetermined extension without receiving a generated voice message and without having to wait for the time required to listen to such a voice message.

16 Claims, 3 Drawing Sheets

TRANSPARENT CALLER INTERACTIVE ATTENDANT BYPASS SYSTEM

This application is a continuation of application Ser. No. 573,423 filed Aug. 27, 1990 now abandoned, which was a continuation-in-part of application Ser. No. 219,505, now abandoned filed Jul. 15, 1988.

BACKGROUND OF THE INVENTION

The present invention relates generally to a caller interactive attendant bypass system where a caller may bypass a switchboard attendant without receiving a generated voice message.

Many systems exist which switch routine prerecorded messages to the calling party, for example, U.S. Pat. No. 3,111,561. Additionally, U.S. Pat. No. 4,696,028 discloses a PBX intercept system which is interactive with a caller to establish a communication path directly to the desired called party without the intervention of a switchboard attendant. The system disclosed in U.S. Pat. No. 4,696,028 utilizes a message system which instructs the caller about a number of potentially desired extension numbers which may be dialed while the message continues. If the caller does not know with which extension number he desires to communicate, the instructional message informs the caller either to dial a designated switchboard attendant's number for assistance or wait for assistance.

While the system disclosed in U.S. Pat. No. 4,696,028 is fine for those individuals knowing which extension they desire to call, individuals not knowing which extension they desire may either not want any of the recited extensions or not be sure which extension is best for them. This means the caller must listen to the entire message before being connected to a live operator for assistance.

It will be appreciated that a certain percentage of our society has a very strong dislike for listening to prerecorded messages. The concept of talking and listening to machines is a long way from being accepted by all humans. Some people have such a hatred of such systems that they will immediately hang up upon receiving a prerecorded message or computer generated voice. Additionally, it will be appreciated that the time delay for people unfamiliar with such a system who are required to wait until the entire message has been communicated before being connected to a live operator is aggravating and wasteful. Accordingly, it is an object of the present invention to provide a system which enables an incoming call to be completed directly to the desired party without the intervention of an attendant while at the same time minimizing delays for callers unfamiliar with the system. The present invention further eliminates the undesirable reactions associated with receiving a prerecorded message generated from the system.

Another problem with existing systems that do not utilize specialized trunk facilities, such as Direct Inward Dial (DID) trunk facilities is that once the caller receives the extension and obtains a busy signal or completes the call, the caller must hang up and redial the number even if he desired to talk to additional parties. It is a further object of the present invention to provide a system which allows the incoming caller upon completion of his discussion with a particular extension or upon receiving a busy signal to be able to dial other extensions without losing the line.

SUMMARY OF THE INVENTION

According to the invention, there is provided a PBX intercept system which allows an incoming caller to complete the call to an internal destination without operator assistance and without receiving a generated voice message.

For additional background and a description of the nonclaimed aspects of the subject invention, reference may be had to Morganstein et al., U.S. Pat. No. 4,696,028, issued Sep. 22, 1987, which is incorporated herein by reference. The subject invention differs from U.S. Pat. No. 4,696,028 in the elimination of a generated voice message and the requirement for a caller uncertain of his desired party to wait until the message has been completed before being connected to a live operator. The caller using the subject invention is connected to a live operator after a predetermined time without receiving a voice message during which the caller may avoid the operator by direct dialing the desired extension.

In operation the caller dials the number handled by the call processor and receives the standard telephone system ring. At the end of the standard telephone system ring the call is accepted by the call processor. If the caller dials nothing for a predetermined period, the system transfers the incoming caller either to the extension of a live operator or another predetermined extension. A ringing sound is generated to the caller unless the call is answered before the ringing is heard by the caller. If the caller knows the number of the individual with whom he desires to communicate, he may dial such number during the predetermined period. The system transfers the call to an extension corresponding to the dialed number and generates a ringing sound to the caller which will be heard unless the call is answered before the sound is transmitted. If the party answers, the connection is made without operator assistance. If the extension corresponding to the dialed number is busy or there is no answer within a predetermined period of time, the caller may dial a predetermined signal, obtain a dial tone and dial any other extension in the system. Upon the completion of a call to a desired extension the caller may also dial a predetermined signal, obtain a dial tone and dial any extension in the system.

DESCRIPTION OF THE FIG. 1 EMBODIMENT

Figure 1:
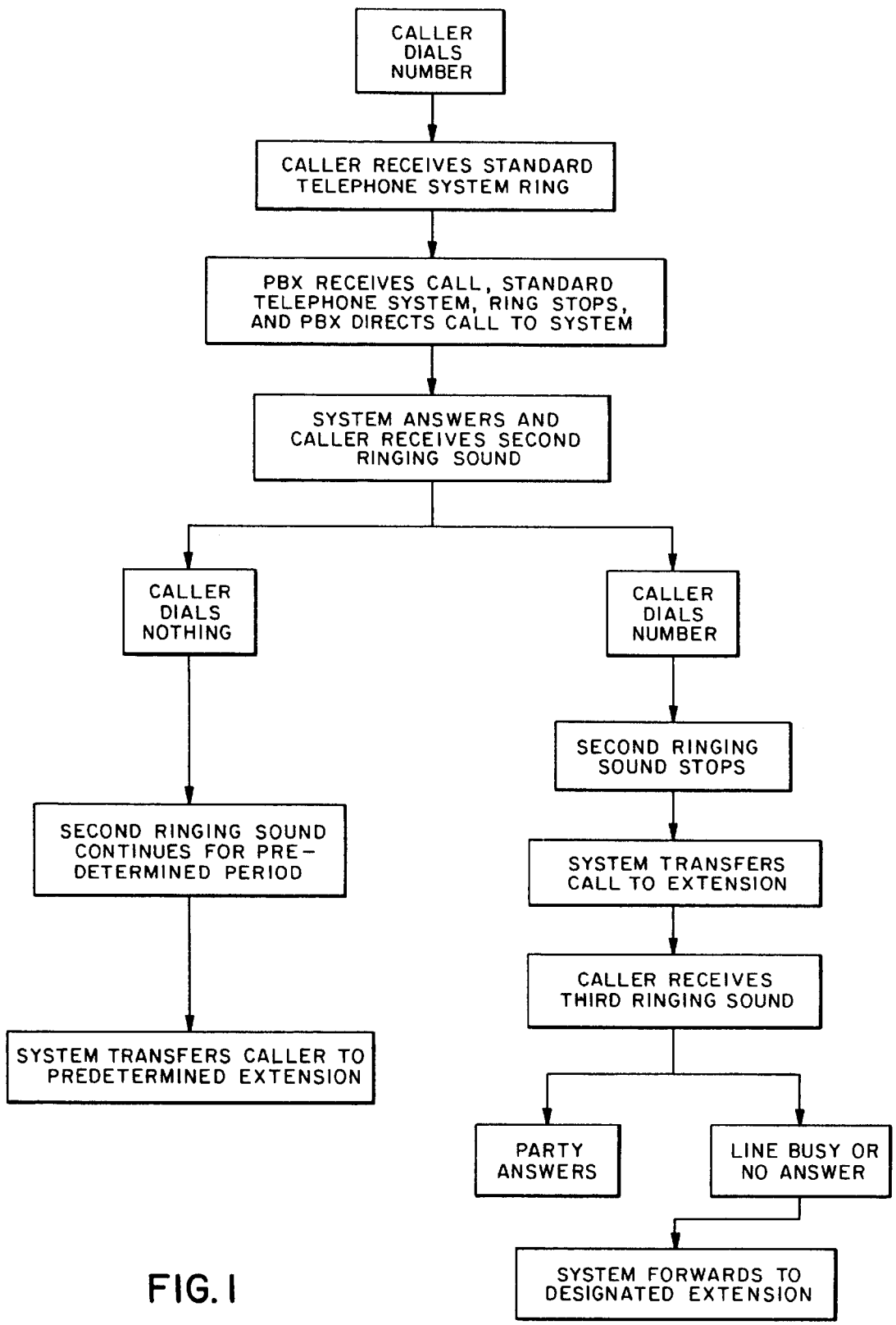
FIG. 1 of the drawings illustrates a flow chart for an embodiment of the present invention.

The embodiment of FIG. 1 may best be understood by reference to FIG. 4 of U.S. Pat. No. 4,696,028 which discloses a detailed block diagram of a PBX intercept system. The FIG. 1 embodiment differs from that shown in FIG. 4 of the '028 patent in that the digital announcement circuits blocks identified as $38_1$ and $38_2$ are replaced with ringing means for generating a ringing sound for transmission to the incoming caller upon being connected to the system. A switchable cross-point matrix connects the ringing means to the calling party.

As shown on the flow chart of FIG. 1, the system begins with a caller dialing the system's number at which point the caller receives the standard telephone system ring. The call processor is provided with means for detecting the request for service from the incoming caller whereupon it receives the call; the standard telephone system ring stops and the call processor directs the call to the system.

Means for causing connection paths to be established to the incoming caller are provided for connecting the caller to the system in response to the request for service whereupon the system answers the call and ringing means for generating a second ringing sound is provided for transmission to the incoming caller once the incoming caller is connected to the call processor. Signal means for generating a signal to advise the incoming caller he is connected to the processor could be provided for transmission to the incoming caller prior to actuation of said ringing means. Additionally, the second ringing sound could be different from the standard telephone system ring.

Means are provided for receiving a number input by the incoming caller while the second ringing sound is being generated. If the incoming caller inputs a number, the second ringing sound stops and means are actuated for transferring the incoming caller to an extension corresponding to the number input by the incoming caller whereupon the caller receives a third ringing sound. Means for terminating the second ringing sound upon the incoming caller's initiation of a number input could be provided. If a party answers, the call is completed without operator assistance. If the extension corresponding to the number input by the incoming caller is either busy or no answer, means are provided for transferring the incoming caller to a predetermined destination within a predetermined period of time.

If the caller does not input a number upon being connected to the call processor, means are provided for transferring the incoming caller to a predetermined destination within a predetermined period of time whereupon the incoming caller may be connected to a live operator without waiting for a generated voice message to be completed.

DESCRIPTION OF THE PREFERRED EMBODIMENT

Figure 2:
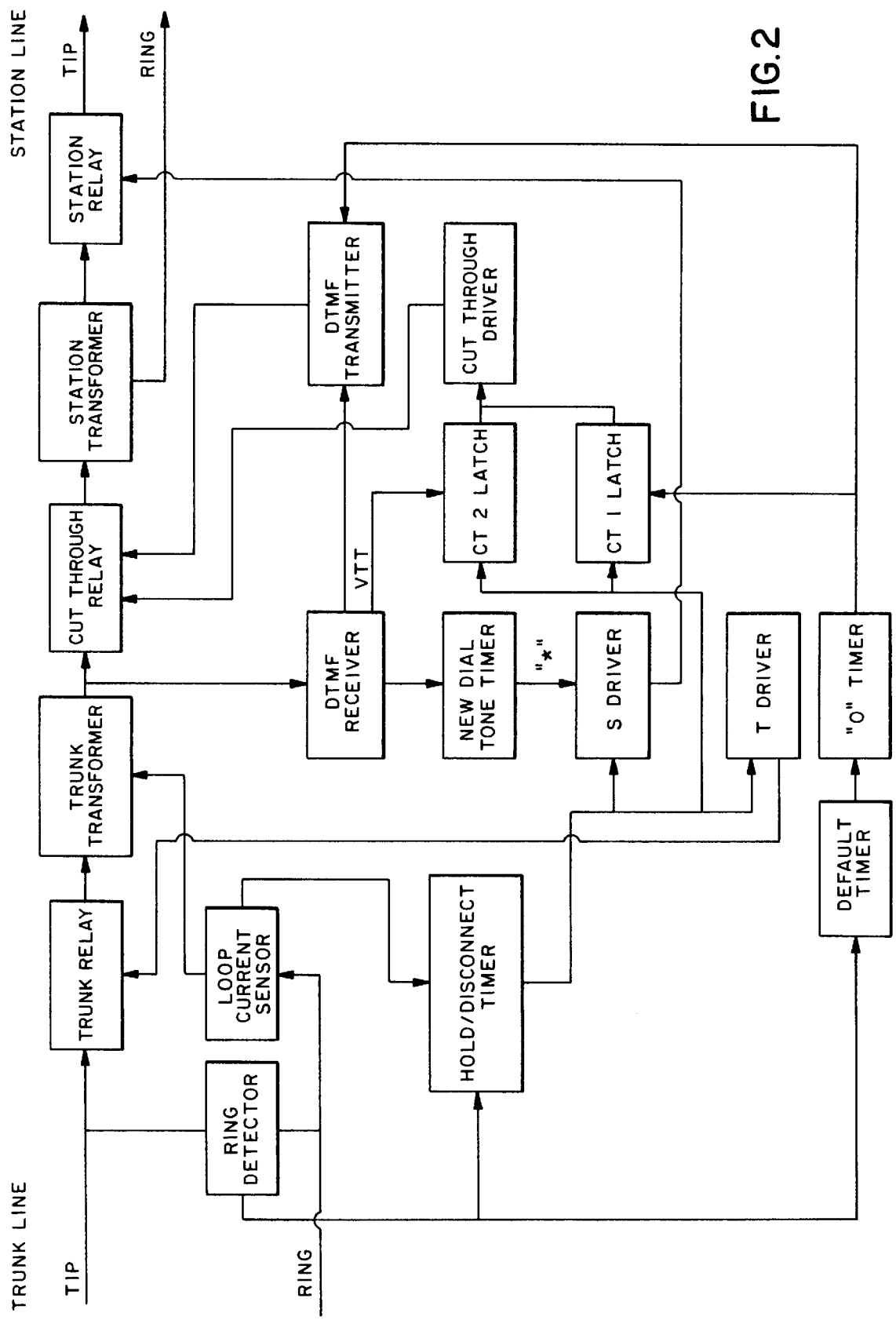
FIG. 2 is a block diagram of a call processor according to the preferred embodiment of the present invention.

Referring now to FIG. 2 there is disclosed a block diagram showing the components of an exemplary call processor which enables the present invention to detect a request for service from an incoming caller and direct such caller to an internal extension. Upon receipt of a ring on an incoming call, a ring detector provides a DC output which triggers a hold/disconnect timer and a default timer at the end of the first ring. The hold/disconnect timer remains on for the duration of the call and provides an output to both a T driver, which is abbreviated for trunk relay driver, a S driver, which is abbreviated for station relay driver. The hold/disconnect timer also provides an output to CT 1 and CT 2 latches. These drivers merely amplify the DC signal to actuate their respective trunk and station relays. A loop current sensor provides an output to the hold/disconnect timer and a trunk transformer as long as the calling party is on the line.

The default timer is actuated by the ring detector and provides an output to the "O" timer, abbreviated for operator timer, for a predetermined time after the end of the first ring. If the caller fails to begin to dial an extension before the predetermined period ends, the "O" timer provides an output to the DTMF transmitter, abbreviated for dual tone multi-frequency transmitter, and a CT 1 latch. The CT 1 latch provides a line to a cut through driver which amplifies the DC signal and energizes a cut through relay. Once the cut through relay is energized a trunk transformer and a station transformer are connected in series and provide an audio path from the trunk to the station in addition to providing DC isolation. The "O" timer also provides a signal to the DTMF transmitter which will send the predetermined signal, a Touch Tone for the desired extension, to the cut through relay for transmission to the desired extension which typically would be a live operator. The PBX receives the signal and connects the call. Unless the call is answered very quickly the caller will begin hearing a ringing sound generated from the PBX.

In the event the incoming caller dials the first digit of an extension prior to the predetermined set time of the default timer, the Touch Tone signal corresponding to the dialed digit is received by a DTMF receiver. The DTMF receiver, upon receipt of the tone dialed by the caller, forces the DTMF transmitter to regenerate the same tone and also provides an output to the CT 2 latch in the event the caller dialed a valid Touch Tone corresponding to an appropriate extension. The CT 2 latch provides a connection to the cut through driver which again amplifies the DC signal adequate to energize the cut through relay which connects the trunk transformer and station transformer. This provides an audio path to the appropriate extension. Again the caller will receive a ringing sound from the PBX unless the call is answered before the ringing begins. In the event the extension is busy or does not answer within a predetermined time period the call processor could be modified to transfer the incoming caller to a predetermined extension such as an operator.

If the caller begins dialing an extension but fails to complete dialing, the PBX will treat it like any incompletely dialed call and generate a fast busy signal.

The DTMF receiver also provides an output to a new dial tone timer whenever a predetermined signal such as an asterisk is dialed. Accordingly, if the extension dialed is busy, or if the call is completed to the desired extension, the caller may dial an asterisk and begin the process over by dialing any other extension he desires to reach.

Figure 3:
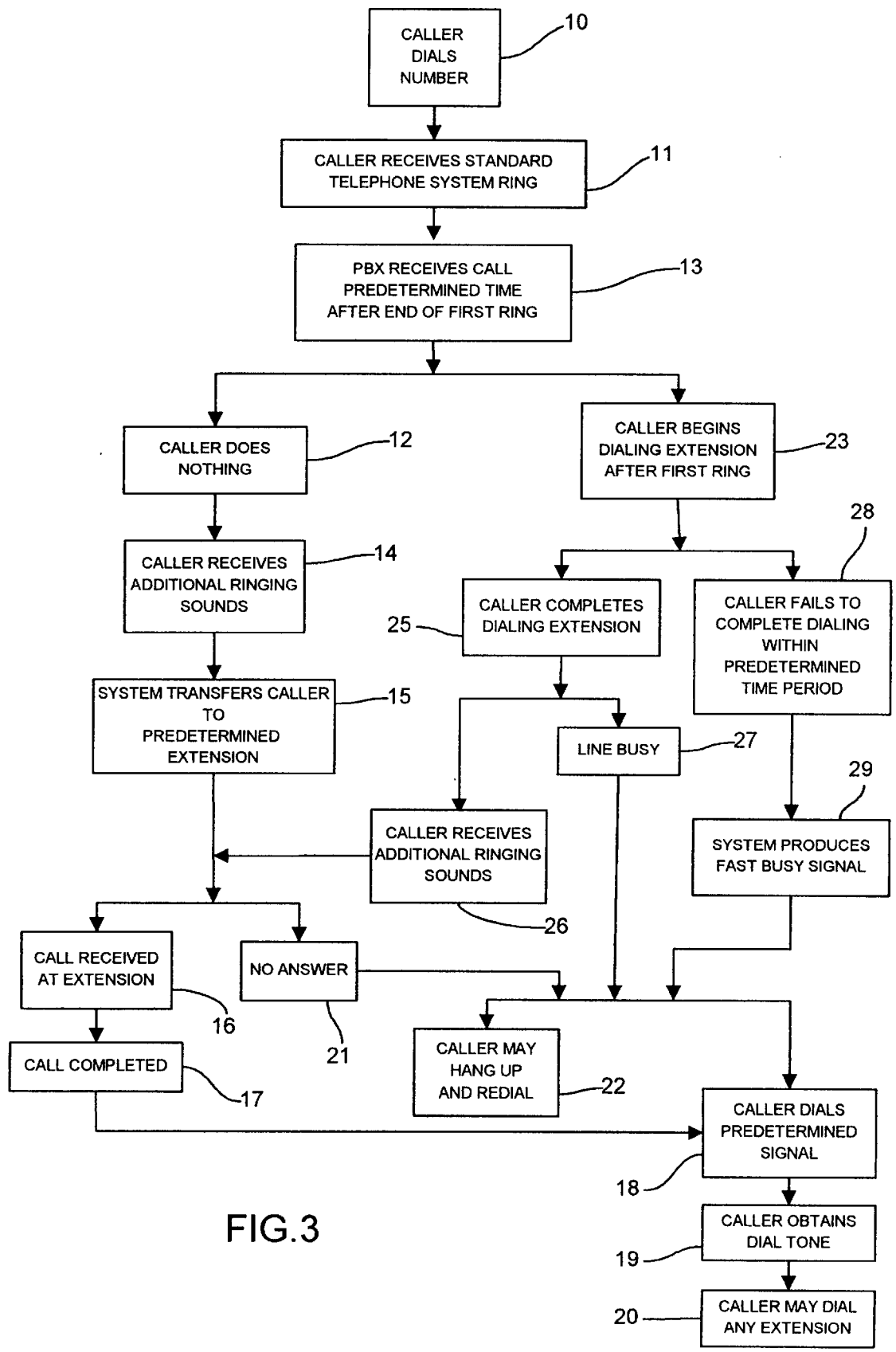
FIG. 3 illustrates a flow chart showing the preferred embodiment of the block diagram of FIG. 2

FIG. 3 discloses a flow chart showing the sequence of the embodiment of FIG. 2 including the addition of providing the caller with the opportunity to make additional connections without having to redial the number.

As seen in FIG. 3 with numerals referencing relevant steps, when a caller dials a number 10 he receives a standard telephone system ring 11. The PBX receives the call 13. If the caller does nothing after a predetermined time after the end of the first ring 12, the caller receives additional ringing sounds 14. The system then transfers the caller to a predetermined extension 15.

After the call is completed at the extension 17, the caller may dial a predetermined signal 18 which provides a dial tone 19 to the caller whereby the caller may dial any extension 20.

If there is no answer at the predetermined extension 21, the caller may either hang up and redial 22 or the caller may dial the predetermined signal 18, obtaining a dial tone 19 and thus dial any extension 20.

Instead of doing nothing after receiving the standard telephone ring, a caller may begin dialing an extension after the first ring 23. If the caller completes dialing the extension 25, the caller will receive additional ringing sounds 26 while the system transfers caller to the dialed extension.

If the line is busy 27 or the caller fails to complete dialing within a predetermined time period 28, after which the system produces a fast busy signal 29, the caller may either hang up and redial 22 or dial the predetermined signal 18, obtain a dial tone 19 and dial any extension 20.

I claim:

1. A call processor for use with a telephone switching system for allowing an incoming caller to complete the call to an internal destination without operator assistance and without receiving a generated voice message comprising:

means for detecting requests for service from the incoming caller, means for causing connection paths to be established to the incoming caller in response to the request for service, ringing means for generating a ringing sound for transmission to the incoming caller, means for receiving a number input by the incoming caller, means for transferring the incoming caller to an extension corresponding to the number input by the incoming caller whereby the caller may avoid operator assistance in reaching a desired party, means for transferring the incoming caller to a predetermined destination without generating a voice message if a number is not input within a predetermined period of time, and means for actuating said ringing means without previously generating a voice message to the incoming caller.

2. The call processor of claim 1 comprising means for transferring the incoming caller to a second predetermined destination if said extension is busy or does not answer within a second predetermined period of time.

3. The call processor of claim 1 comprising means for terminating said ringing sound upon initiation of said number input by the incoming caller.

4. The call processor of claim 1 comprising signal means for generating a signal for transmission to the incoming caller upon being connected to the call processor.

5. The call processor of claim 4 comprising means for actuating said signal means prior to said ringing means.

6. A call processor for use with a telephone switching system for allowing an incoming caller to complete the call to an internal destination without operator assistance and without receiving a generated voice message comprising:

means for detecting requests for service from the incoming caller, means for causing connection paths to be established to the incoming caller in response to the request for service, means for receiving a number input by the incoming caller, means for transferring the incoming caller to an extension corresponding to the number input by the incoming caller without operator assistance and without generating a voice message prior to transfer, and means for transferring the incoming caller to a first predetermined destination without operator assistance and without generating a voice message prior to transfer if a number is not input within a predetermined period of time.

7. The call processor of claim 6 comprising ringing means for generating a ringing sound for transmission to the incoming caller, and first means for actuating said ringing means if a number is not input within a predetermined period of time.

8. The call processor of claim 7 comprising second means for actuating said ringing means if a number is input by the incoming caller within a predetermined period of time.

9. The call processor of claim 8 comprising means for transferring the incoming caller to a second predetermined destination if said extension is busy or does not answer within a second predetermined period of time.

10. The call processor of claim 6 comprising means for receiving a signal from the caller after completion of a call whereupon the caller may input another number without having to redial the call processor.

11. The call processor of claim 7 comprising means for receiving a signal from the caller after completion of a call whereupon the caller may input another number without having to redial the call processor.

12. The call processor of claim 8 comprising means for receiving a signal from the caller after completion of a call whereupon the caller may input another number without having to redial the call processor.

13. The call processor of claim 9 comprising means for receiving a signal from the caller after completion of a call whereupon the caller may input another number without having to redial the call processor.

14. The call processor of claim 6 comprising means for transferring the incoming caller to a second predetermined destination if said extension is busy or does not answer within a second predetermined period of time.

15. The call processor of claim 7 comprising means for transferring the incoming caller to a second predetermined destination if said extension is busy or does not answer within a second predetermined period of time.

16. The call processor of claim 8 comprising means for transferring the incoming caller to a second predetermined destination if said extension is busy or does not answer within a second predetermined period of time.

\* \* \* \* \*